Jan. 7, 1930.  E. C. FICHTNER  1,742,638

ELECTRIC HEATER AND THERMOSTATIC CONTROL THEREFOR

Filed Jan. 11, 1928

INVENTOR
Edwin C. Fichtner.
BY
Townsend, Loftus & Abbett
ATTORNEYS.

Patented Jan. 7, 1930

1,742,638

UNITED STATES PATENT OFFICE

EDWIN C. FICHTNER, OF SAN FRANCISCO, CALIFORNIA, ASSIGNOR OF ONE-HALF TO JOSEPH H. SIMON, OF OAKLAND, CALIFORNIA

ELECTRIC HEATER AND THERMOSTATIC CONTROL THEREFOR

Application filed January 11, 1928. Serial No. 245,885. REISSUED

My present invention relates to electric immersion heaters and particularly to thermostatic conrol means therefor.

An object of my invention is to provide a novel form of heater unit having thermostatic means provided therewith which will be operative in all conditions under which the heater element may be used.

Another object of my invention is to provide a thermostatic control means for electric heaters of the above type which will be effective to control the temperature under both normal and abnormal conditions.

A further object of my invention is to provide an electric heater element with thermostatic means which will be effective to control the circuit of the heater unit and open the same in response to abnormal conditions which may exist at any point along the length of the heater unit.

For a better understanding of my invention, reference should be had to the accompanying drawing, in which—

Figure 1:
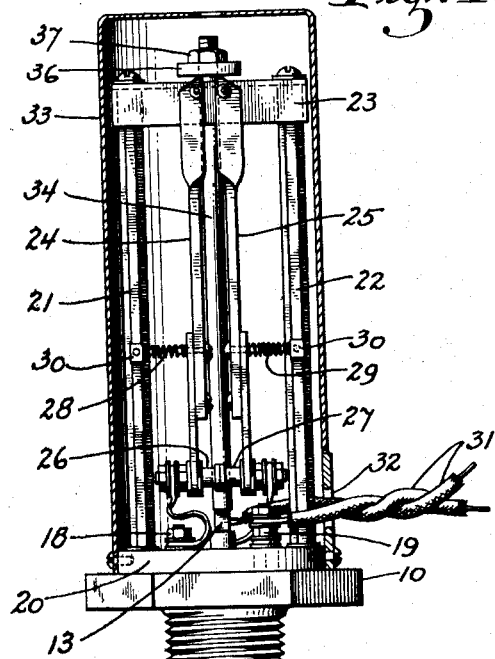
Figure 2:
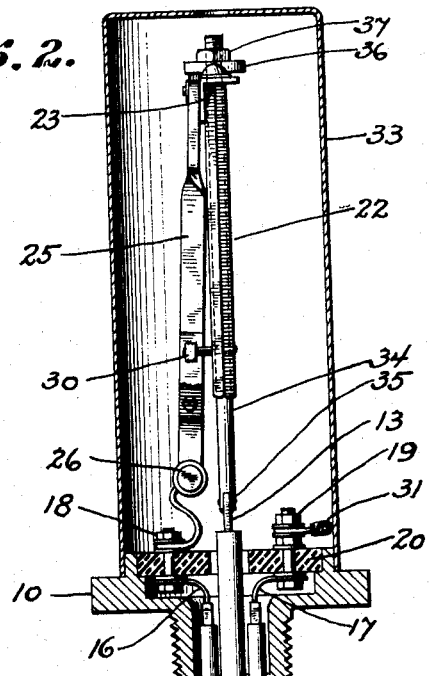
Figure 3:
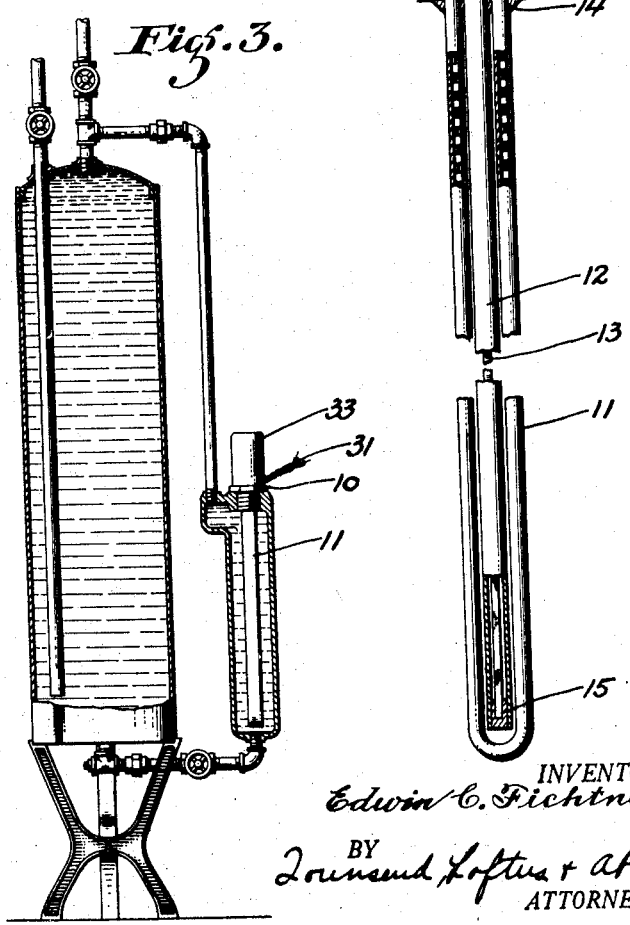

Fig. 1 is a front elevation, partially in section, showing one modification of my invention, Fig. 2 is a side elevation of the heater unit shown in Fig. 1, partially in section, showing one arrangement of a thermal element in conjunction with a heater element, and Fig. 3 is a front elevation of an ordinary household water heater provided with a heater unit of the type shown in Figs. 1 and 2.

In the drawing, 10 designates an ordinary screw plug such as is commonly used with plumbing fixtures. Passing downwardly through this plug and adapted to be immersed in a liquid I show a heater element 11 which is bent in the shape of a hairpin. Such heater units are commonly known as of the hairpin type.

By referring to Fig. 2 of the drawing, it will be seen that I have provided a second or thermostatic element which also projects downwardly through the plug 10 between the parallel sides of the hairpin unit 11. This thermostatic element comprises a tubular member 12 having a relatively high coefficient of expansion and an internal member or rod 13 having substantially a zero coefficient of expansion. I have found in practice that almost any metal having a low or zero coefficient of expansion makes a very good material for the rod 13. The tubular member 12 and also the outer jacket of the heater unit 11 are welded to the fitting 10 at the point 14, thus providing a sealed joint when the plug 10 is properly screwed into place. The lower end of the tubular member 12 and the corresponding end of the rod 13 are welded together at 15 and this end of the tube 12 is sealed during the welding operation.

From the above it will be seen that with the parts assembled as described, the member 12 and its attached heater unit and thermostat will constitute a complete seal or closing means which will prevent the escape of any water or steam from the container to which such a heater unit may be attached. The terminal ends 16 and 17 of the heater unit 11 are brought out through the upper side of the plug 10 and are permanently attached to terminals 18 and 19. The terminals 18 and 19 are secured to an insulating block 20 which is secured to the outer surface of the plug fitting 10. By referring back to Fig. 1, it will be seen that I have provided two parallel upright supports 21 and 22. Arranged across the top of these supports I provide a bridging member 23 and secured thereto I show pivoted arms 24 and 25 which carry contacts 26 and 27 which cooperate with each other to establish an electric circuit. The pivoted arms 24 and 25 are biased toward each other by means of springs 28 and 29 which are arranged in line with the contact arms between the outstanding lugs 30 arranged upon the parallel upright members 21 and 22. The contacts 26 and 27 are connected in series in one side of the heater unit, the circuit being from the terminal 19 through the heater unit to the terminal 18 through the contacts 26 and 27 and to a third terminal similar to terminal 19 to which the other side of the power circuit is also attached, the external circuit leads 31 passing out through an opening 32 in a suitable cover 33. The bridging member 23 also forms a guide for a vertically movable member 34 which is secured at 35 to the upper end of the rod 13 so that as the tubular member 12 expands and contracts the vertically movable member 34 will be caused to move up and down through the guide formed by the bridging member 23.

Above the bridging member 23 and secured to the member 34 I provide an adjustable disk 36 which, when properly located, is secured in place by a nut 37. The disk 36 overhangs the side of the bridging member 23 and engages off-center points upon the pivoted members 24 and 25 so as to cause them to oscillate scissors fashion as the thermostatic element expands and contracts.

The operation of my device is as follows, assuming that the heater unit has been installed in a tank or heater system with its heating portion immersed in a liquid which it is desired to heat. Under these conditions with the heater cool, the circuit comprising the contacts 26 and 27 will be closed and when the power circuit is energized, current will flow through the heater and thus cause the liquid to be heated. As the temperature of the liquid increases the expansible tubular element 12 will expand, that is, elongate, and since the rod 13 will not expand, a tension will be exerted therethrough upon the member 34 so as to create a pressure upon the off-center portions of the pivoted arms 24 and 25 and when the temperature of the water has reached a predetermined value as determined by the setting of the disk 36, the contacts 26 and 27 will be opened, thereby cutting off the supply of current to the heater unit.

The above presupposes normal operating conditions. There are a great many thermostatic control elements for heaters of this type which operate very satisfactorily under the above conditions, but it is under abnormal conditions such as will be hereinafter described that my invention finds its greatest utility. Assuming that the liquid has been drawn off or has evaporated so as to leave a portion of the heater unit 11 exposed thereabove, or that for some other reason some one particular portion of my heater unit should attain an excessive and dangerous temperature which might destroy it, as would be the case under the above conditions, my arrangement of the thermal element adjacent the total length of the heater unit will place the thermal control element along the whole length of the heater unit and responsive to abnormal conditions which may exist at any point therealong and, as a result, the thermal element will be responsive to conditions at all points along the heater element, rather than responsive to conditions as they exist at some remote point as is common practice in all the prior art devices of this character which the applicant is aware of.

It is well known that the radiating capacity of a heater element of the above type is greatest when the same is immersed in water and I have found that, where a heater of this type is energized to its full capacity unsubmerged, it will become red-hot and eventually will burn out and, in order to protect the heater against burning out due to excessive temperatures at any point therealong, I have found it desirable to arrange thermostatic protection therefor which will be responsive to temperatures along its total length.

From the above it will be seen that I have provided a new and novel form of thermostatic control means for heater elements which is responsive to the condition of the heater element throughout its whole length rather than responsive to a temperature which may exist at some remote point and, while I have shown the preferred form of my invention as now known to me, it should be understood that this showing is only by way of illustration and that various changes may be made in its construction without departing from the spirit of the invention as defined in the appended claims.

Having thus described my invention, what I claim and desire to secure by Letters Patent is:—

1. In a liquid heater of the character described, the combination of a U-shaped heater element, a cap for supporting said heater element adapted to close the liquid container, and a thermo-responsive means projecting through said cap between the parallel sides of said U-shaped heater element adapted to operate a circuit controller mounted upon said cap outside of said container.

2. In an immersion heater of the character described having a closed container, the combination of a U-shaped heater element, and a thermo-responsive means arranged between the parallel sides of said U-shaped heater element and extending substantially to the root of said heater element, whereby said thermo-responsive means will be exposed to heat radiated from said heater element should said heater element become unsubmerged.

3. In an immersion heater of the character described, the combination of a liquid container, a closure member for said container, an electric heater element secured to one side of said closure member, a switch mounted upon the opposite side of said closure member, and a thermo-responsive means secured to said closure member and extending adjacent said heater element adapted to operate said switch and control the heater circuit.

4. In combination with an electric heater of the character described, the combination of a container, a closure member for said container, a switch upon said closure member outside of said container, a tubular member secured to said closure member projecting into said container and having its inwardly projecting end sealed, and means secured to said tube at its sealed end adapted to operate said switch in response to temperature changes in said container.

5. In combination with an electric heater of the character described, a container closure member, a pair of parallel extending supports upon said closure member, a pair of contact arms supported by said parallel extending supports, a heater element carried by said closure member and projecting therefrom in the opposite direction to said parallel extending supports, and a thermo-responsive means carried by said closure member projecting adjacent to said heater element adapted to cooperate with said parallel extending supports to move said pivoted contact arms and control the circuit of said heater element.

6. In an immersion heater of the character described, the combination of an elongated U-shaped heater unit, and a temperature responsive element arranged parallel therewith between the legs of the U and extending substantially the full length of the heater element, whereby said temperature responsive element will be sensitive to the heat of said heater element throughout its length.

7. An electric immersion heater unit for hot water tanks comprising a cap adapted to close the opening through which the heater unit extends into the tank, an immersion type of heater unit secured to the inner side of said cap having its terminals projecting to the outside of said cap, a circuit controlling switch connected to said terminals mounted upon the outside of said cap, and a thermo-responsive means also mounted upon said cap adapted to operate said circuit controlling switch in response to temperature changes of said heater unit, said heater unit, said switch and said thermo-responsive means being each independently mounted upon said cap in cooperative relation so that the whole may be applied to and removed from the tank as a unit.

EDWIN C. FICHTNER.